Jan. 9, 1962     G. J. C. ANDRESEN     3,016,460
METHOD AND APPARATUS FOR WEB THICKNESS CONTROL
Filed April 14, 1958     2 Sheets-Sheet 1

*INVENTOR.*
GILBERT J. C. ANDRESEN
BY
ATTORNEY

United States Patent Office 3,016,460
Patented Jan. 9, 1962

3,016,460
METHOD AND APPARATUS FOR WEB THICKNESS CONTROL
Gilbert J. C. Andresen, Stow, Ohio, assignor to The Goodyear Tire & Rubber Company, Akron, Ohio, a corporation of Ohio
Filed Apr. 14, 1958, Ser. No. 728,240
17 Claims. (Cl. 250—83.6)

This invention relates to radiation thickness gauges and in particular to multi-station radiation gauges and the method of calibration and control thereof by a single selector element.

The use of radiation gauges to measure the variation in thickness of a traveling film or web is well known in the art. Recent developments and improvements in radiation sources and gauges have fostered a tremendous increase in the utilization of radiation measuring systems for such purposes. Among the many problems facing the art is the provision of a simple yet efficient system which will permit the use of a plurality of gauges for monitoring the thickness of a traveling radiation absorptive web. While it is possible to use a plurality of gauges spanning a given web width, it has heretofore been impossible to calibrate the gauges and control their response from a single selector element in a simple reliable manner. This has seriously limited the use of radiation gauges in the control of wide, rapidly moving thin films and the like.

It is a primary object of the present invention to provide a simple reliable single calibration and control system for multi-station radiation gauges.

It is a further object of the present invention to provide a method for controlling multi-station radiation thickness gauges which will permit rapid and accurate selection of a desired web thickness with a minimum of effort.

It is an additional object of the present invention to provide a multi-station radiation thickness gauge system which continuously and automatically senses thickness variations in a traveling web and makes the necessary corrections to produce a web of the desired predetermined thickness.

These and other objects of the present invention will become apparent from the following description and drawings in which.

Figure 1:
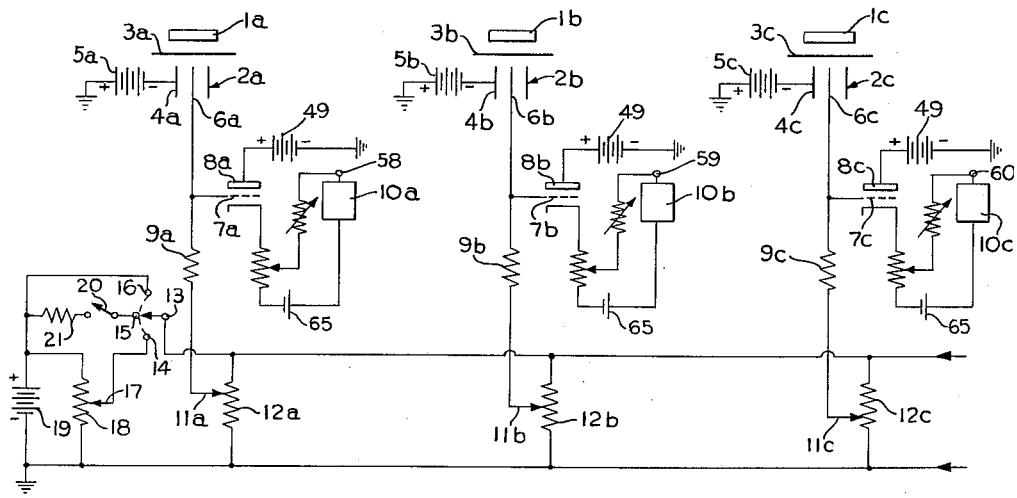
FIG. 1 is a schematic diagram of the radiation gauge and its associated calibration and thickness selection circuit.

As mentioned previously, the control of the thickness of wide, rapidly moving, thin films or webs has presented many problems. It has been found, for instance, that wide webs must be monitored for thickness variations across substantially their entire width in order to assure uniformity of product. This has been particularly true in the production of thin transparent webs which are to be used for packaging, decorative surfaces, electrical insulation, etc. It is extremely important, furthermore, that the web thickness be measured substantially continuously at at least a plurality of points across the width of the web. One reason for this is that films are produced at such high traveling speeds that any substantial time lag in the measuring and control system may result in the production of a large quantity of defective film during the period in which the gauge is unable to detect the thickness defect. In addition, since thin films must be held within very narrow thickness limits in order to be economically practical, it is of utmost importance that the gauge system have high inherent stability and accuracy.

Among the proposed solutions of the problems mentioned has been the use of a single radiation gauge mounted on a traveling rail which periodically moves across the web to measure the thickness variation edge to edge. Such a system is not satisfactory in many cases since the web width is scanned only once in the relatively long period of time necessary for the gauge to complete one traverse of the film or web. This, as previously pointed out, may result in the production of a large quantity of defective product during the traverse cycle until suitable correction can be made. Additionally, such system must, of necessity, result in discontinuities in web thickness since only one sensing and correction is possible in each traverse cycle of the gauge.

It has been proposed to use a plurality of gauges located at spaced points across the web thickness to monitor and control web thickness. While such an approach has merit, since it avoids some of the limitations of a complex traveling gauge system, other disadvantages are apparent. Among these are that it has been found that the variation in response and sensitivity between the separate gauge stations is such that without some means to assure uniformity in gauge readings the deviation from gauge to gauge exceeds the permissible deviation in web thickness. Where, as is the case with wide webs or films, a substantial number of gauges must be used, this is a great problem. Some of the reasons for the deviations between gauges which are encountered, no matter how much care in manufacture is undertaken, are: (1) No two radiation sources are exactly the same in strength or characteristics; (2) Because of small variations in parts, no two radiation sensing devices, for example ionization chambers, have the same sensitivities; and (3) No two electrical elements such as resistors have the same characteristics or inherent stabilities. Thus, even though extreme caution is exercised in the manufacture and selection of components (a very expensive approach at best), multi-station gauges will have varying responses. A solution to the problem is to provide for calibrating each station to assure that the response is known and the desired operating point may be selected. Heretofore, this has resulted in the very unsatisfactory situation which required that the operator of a film producing apparatus calibrate and set as many as a dozen separate gauging stations each time a film of a different thickness is to be produced. This many times necessitated shutting down the machine with the usual loss of production and increase in labor costs. Furthermore, the task of setting each station to the desired point each time the film thickness is to be changed is tedious and exacting with costly errors often resulting. The present invention satisfactorily solves the above problems and permits the use of any number of radiation gauges by providing a system of calibration proportional to the response characteristics of the separate gauges. Subsequently any desired film thickness may be selected by the operator from a single, easily accessible point. In addition, the circuit utilized provides for extreme accuracy in each individual station through a null or zero point indicating system.

According to the present invention, the solution to the single control problem is accomplished broadly by the method of creating in each station of the gauge a condition representative of 100% radiation absorption and setting the stage output at the null or zero condition under these circumstances. A condition representative of zero radiation absorption is then created in each station and a null or zero output voltage condition is created by presenting an opposing proportional voltage at each station to zero balance each station and thereby eliminate inherent factors affecting the individual responses of the stations. The opposed voltage is generated in a single source common to the plurality of stations. Subsequently, a null condition is created in all stations at absorptions representative of various desired film or web thicknesses and the setting necessary on the master control of the opposing voltage source is noted for use in future thickness selections. Apparatus for practicing the method described is illustrated in FIG. 1. It will become clear as the description proceeds that other apparatus may be utilized or the immediate gauge circuit there illustrated modified in a manner obvious to those skilled in the art to accommodate different gauge components without substantial alteration in the calibration and control system per se.

Referring to FIG. 1, a schematic of a multi-station radiation gauge having three stations with the associated calibration and control circuit is illustrated. It is obvious that any number of stations may be utilized, the number shown being merely illustrative.

The gauges comprise radiation sources $1a$, $1b$, and $1c$ and radiation sensing devices $2a$, $2b$, and $2c$ disposed oppositely thereto. A radiation absorptive traveling film or web is schematically depicted and identified by numerals $3a$, $3b$ and $3c$. Ionization chambers have been found to be satisfactory radiation sensing devices for use in the present invention although other sensing devices may be used. In general, any radiation sensing device whose output is substantially proportional to the incident radiation energy may be used. This would include devices using photo-multiplier tubes and the like as well as the ionization chambers illustrated. While with such other devices, minor modification of the immediate gauge circuit may be necessary, such modifications are well within the skill of the art. Notwithstanding such small changes, the calibration and control circuit to be described may be used with the class of devices mentioned without substantial alteration and is therefor broadly applicable to radiation gauges having an energy dependent output. For the purposes of this description, the term radiation sensing device should be understood to mean such devices. A variety of radiation sources may be used, although for the purpose of measuring thin films a beta ray (electron) source is preferably since the optimum absorption is thus obtained. Many radioisotopes having useful half-lives and adequate beta ray energies are now available as sources, carbon 14 and strontium 90 having been successfully used in gauges of the present invention. The ionization chambers $2a$, $2b$, and $2c$ have outer conductors $4a$, $4b$, and $4c$ which are connected through potential supplies $5a$, $5b$, and $5c$ to ground. The inner conductors $6a$, $6b$, and $6c$ of the ionization chambers are connected to grids $7a$, $7b$, and $7c$ of electrometer tubes $8a$, $8b$, and $8c$ and also to one end of the high resistances $9a$, $9b$, and $9c$. While other evaluating means may be utilized, electrometers have been found to be very satisfactory for the purposes of obtaining high sensitivity. The electrometers are energized and balanced through conventional circuitry well known in the art which need not be described here. The outputs of the electrometer tubes $8a$, $8b$, and $8c$ are connected across loads $10a$, $10b$, and $10c$ which are shown in block form through a conventional cathode follower arrangement. The loads may include a variety of devices, of course. One form used to provide complete automation to the film thickness control will be subsequently described. The other ends of resistances $9a$, $9b$, and $9c$ are connected to the moving contacts $11a$, $11b$, and $11c$ of potentiometers $12a$, $12b$, and $12c$. These potentiometers have one end connected to ground which completes the circuit between the inner and outer conductors of the ionization chambers $2a$, $2b$, and $2c$. Thus, the gauge circuit which includes the radiation sensing devices and the electrometers and loads acting as evaluating elements, has no effect in operation on the control and calibration circuit but, as will appear, is influenced by the latter through the potentiometers $12a$, $12b$, and $12c$ which serve as connecting and proportioning elements.

The other end of the potentiometers $12$ are connected to a line containing switch $13$ having poles $14$, $15$, and $16$ connectable thereto. Pole $14$ is connected to the sliding contact $17$ of potentiometer $18$ which is connected in parallel with steady voltage source $19$. Pole $15$ is connected to a second switch $20$ which makes a circuit through resistor $21$ through the voltage source to ground. Pole $16$ connects directly through voltage source $19$ to ground.

A brief description of the mode of operation of one station of the gauge will aid in an understanding of the calibration and film thickness selection procedure. In order to isolate the stations of the gauge from the influence of the calibration and selection circuit, switch $13$ is set at pole $15$ and switch $20$ is maintained open. Thus each station will operate over the effective range of the output device, such as an electrometer, as an individual stage. Referring to the circuit of the station which senses radiation from source $1a$, the outer conductor $4a$ is maintained at a negative voltage and the inner conductor $6a$ at a positive voltage by voltage source $5a$, the magnitude of the voltage being dependent on the size of the source chosen. Source $5a$ may be made variable and adjustable if desired by a number of expedients well known in the art. This is not usually necessary since, above a certain minimum, the magnitude of the voltage of source $5a$ has little affect on the gauge operation. Under the polarity conditions stated, beta rays from source $1a$ which pass unabsorbed through traveling web $3a$ will cause electronegative and positive ionization of the gas in the chamber, negative ions being attracted to the positive inner conductor $6a$ of chamber $2a$ and positive ions to the outer conductor. This causes a current to flow down the line through voltage dropping resistor $9a$ and the series portion of potentiometer $12a$ to ground and thence through voltage source $5a$ to the outer conductor $4a$ of the ionization chamber $2a$. The effect of potentiometer $12a$ in the circuit may be eliminated by moving the contact $11a$ down so that the potentiometer resistance is effectively removed from the circuit if one wishes merely to measure the gauge output over the range of the indicating device used. Since current flows down the line from the inner conductor, the grid $7a$ of electrometer tube $8a$ is held at some negative potential value depending on the voltage drop in the resistor $9a$. Thus current flowing in the resistor impresses a signal on the grid of electrometer $8a$ which is proportional to the ion current and hence the energy of the unabsorbed radiation reaching ionization chamber $2a$. Electrometer tube $8a$ will generate an output which varies in proportion to the radiation absorption by the traveling web $3a$ and transmit this output to the load $10a$. Of course, the other stations will operate in a similar fashion although, as mentioned, the response from station to station will vary as the characteristics of the sources, radiation sensors, and evaluating means vary.

The method of calibrating the multi-station system to equalize responses in the various stations and permit film thickness selection from a single control point is as follows. With switch $13$ set to pole $15$ and switch $20$ open, as before described, the radiation sensing devices, the ionization chamber $2a$, $2b$, and $2c$ in the case illustrated, are set to a condition of zero signal at zero incident radiation. This is accomplished by blocking the path of radiation from the sources to the sensors by means of a shutter which absorbs the beta rays. Any reasonably dense material will serve as a shutter, aluminum being found to be quite adequate for present purposes. Of course, an equally effective but more cumbersome technique is to remove the sources from the gauges. The use of a shutter is obviously preferable. With no incident radiation arriving at the sensors $2a$, $2b$, and $2c$, no current flows in the line connected to the grids $7a$, $7b$, and $7c$ of electrometers $8a$, $8b$, and $8c$. Thus, the electrometers should be at zero and generate no output to the loads $10a$, $10b$, and $10c$. Under these conditions, the electrometer and load circuits are set to the zero or null output condition by a variety of means well known in the art.

When all evaluating circuits have been set to the null output condition, the sensors are then subjected to a zero film thickness condition which amounts to removing the shutter from between the sources and the sensors and allowing the gauges to operate with no film interposed between the sources 1a, 1b, and 1c and ionization chambers 2a, 2b, and 2c. Under such conditions, maximum current flows from the inner conductors 6a, 6b, and 6c through the voltage dropping resistors 9a, 9b, and 9c and the series legs of potentiometers 12a, 12b, and 12c to ground. Thus, grids 7a, 7b, and 7c receive a maximum voltage although the signal is not identical from station to station due to variations between station source, ionization chamber and dropping resistor characteristics. During this condition, switch 13 is connected to pole 16. This connects steady voltage source 19 to the circuit which develops a proportional voltage across the balancing potentiometers 12a, 12b, and 12c. The moving contacts 11a, 11b and 11c of the potentiometers are then positioned so that an oppositely polarized voltage of sufficient magnitude to cancel the ion generated voltage at the grid of the electrometers is generated across resistors 9a, 9b, and 9c. This will be indicated by a zero output at the electrometers and may be conveniently checked by any of a variety of meters. Although each potentiometer may be set at a slightly different position, all stations are at a zero output condition for maximum radiation, as well as for minimum radiation as previously described. The potentiometers 12a, 12b, and 12c, once set to provide the null output condition for maximum incident radiation at the sensor elements, are left at the positions selected.

Switch 13 is then connected to pole 14 which is in turn connected to the adjustable contact of potentiometer 18. Potentiometer 18, of course, receives a full signal across it from steady voltage source 19 through the connections shown. With a film of known radiation absorption qualities, for example one which absorbs 50% of the radiation emitted by each source, interposed between the sources 1a, 1b, and 1c and the sensors 2a, 2b, and 2c, the contact 17 of potentiometer 18 is moved until a proportional voltage of sufficient magnitude is impressed on the grid of the electrometers through the potentiometers 12a, 12b, and 12c to create a null or zero voltage output at the electrometers 8a, 8b, and 8c. The position of the contact 17 on potentiometer 18 is noted or marked for the particular radiation absorption value used. In a similar manner, other radiation absorption values are selected and the null condition position of contact 17 noted. In this fashion a calibration curve for the multi-station system operating as an integrated unit may be made. Thus, during subsequent operations the operator need change only the position of contact 17 to select a desired radiation absorption, and hence film thickness, and the entire multi-station radiation gauge system is automatically set proportionally to have uniform response in all stations. Since the system is designed to operate on a null condition, any deviation from zero electrometer output instantly warns the operator of the variation in film thickness from the desired standard set on potentiometer 18. If the film production apparatus is automated, such output may be used to signal the automatic control both the direction and magnitude of the variation in film thickness and thereby rapidly effect a correction thereof.

In order to provide a rapid check of the electrometer sensitivities, a percent deviation system is provided by means of resistor 21 and switch 20 which permits the operator to periodically ascertain whether the electrometers or similar devices have drifted substantially from zero. This test is conducted with the radiation sources shuttered, as previously described, due to inherent aging qualities or other causes. In checking deviation, switch 13 is set to pole 15 and switch 20 is closed. Resistor 21 is chosen to have any convenient value so that the signal from voltage source 19 through resistor 21, switch 20, and switch 13 to the potentiometers 12a, 12b, and 12c represents a known deviation in film or web thickness. When the aforementioned switches are closed, the electrometer of each station will receive a voltage from its corresponding potentiometer which in a virtual sense represents a deviation in radiation absorption and hence a film thickness variation. When the electrometers each receive the standardized deviation voltage thus generated, it is a simple matter for the operator to determine by the swing of the electrometers from the null position whether they are in sensitivity balance with each other. As will appear from the description of the complete automated system of FIG. 2, a bank of meters is provided at a convenient point to facilitate reading null points and the variations in sensitivities in the system during the calibration procedure as well as during subsequent production runs.

The system described has been tested for reliability and accuracy by varying the parameters of radiation source strength and resistance components by as much as 50% from station to station. Tests reveal that the calibration and control system of the present invention functions to maintain the entire multi-station system to within plus or minus 1% accuracy for any absorption factor or film thickness selected by the setting of contact 17 of potentiometer 18 even with such wide variation in circuit parameters.

Figure 2:
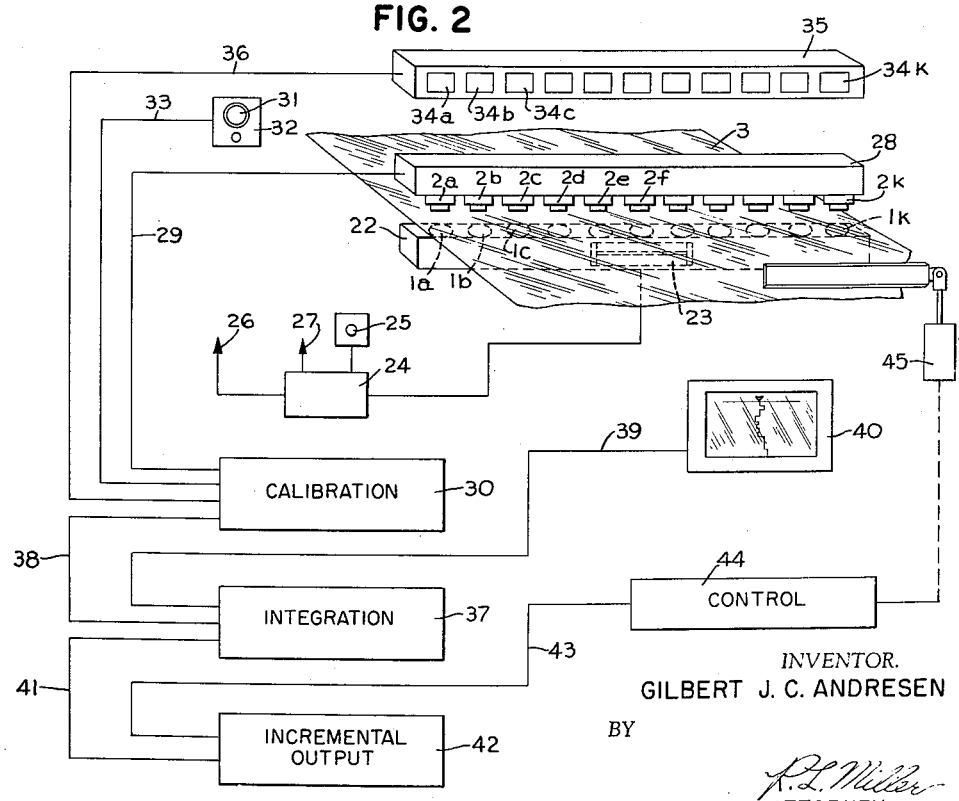
FIG. 2 is a block diagram of the multi-station gauge and automation system.

An automated multi-station radiation thickness gauge system is illustrated schematically in FIG. 2. Radiation sources 1a, 1b, 1c . . . are shown with radiation detectors 2a, 2b, 2c . . . in juxtaposed relation thereto. A radiation absorptive traveling film or web 3 is interposed between the two. The sources are contained in a cabinet 22 having an air cylinder 23 therein which actuates a radiation absorptive shutter system (not shown) for use in blocking the radiation for calibration purposes. The air cylinder 23 is controlled by an air valve 24 actuated by push button 25. Lines 26 and 27 connect the air valve 24 to a compressed air source (not shown). The radiation sensing devices are housed in cabinet 28 and are connected electrically through cable 29 to the calibration and power source cabinet 30. Cabinet 30 houses the circuit components shown in FIG. 1 with the exception of the radiation sources and sensors and the potentiometer 18. Potentiometer 18 is physically in the form of a circular potentiometer 31 housed in film thickness selection cabinet 32 which is connected to the calibration circuit cabinet through cable 33. A bank of meters 34 is housed in cabinet 35. The meters are connected across the output of the electrometers 8a, 8b, 8c in the calibration circuit cabinet 30 by means of cable 36. The meters read the instantaneous variation of weight or thickness of the film or web 3 and are electrically a part of the loads 10a, 10b, and 10c illustrated in FIG. 1. Signals developed in the radiation sensors are also transmitted to the integrator control cabinet 37 by means of cables 29 and 38. An electrical circuit housed in cabinet 37 integrates the output from each radiation circuit so that the resulting electrical signal represents the average thickness deviation in the traveling film rather than the instantaneous value as received by the meters 34 in the cabinet 35. These averaged signals are fed by means of sequential switch control through cable 39 to a conventional strip chart recorder 40 to provide a permanent visual production record. The integrated signals are also transmitted by way of cable 41 to a proportional incremental control signal circuit housed in cabinet 42. This circuit senses the incoming signals and discriminates as to the direction and extent of deviation in film thickness for any point being monitored. The resulting incremental polar signal is transmitted through cable 43 to an automation system controller in cabinet 44 which translates the electrical criteria into mechanical criteria and makes the necessary adjustments in the film producing apparatus through the mechanical device 45 which alters the position of the calender roll, doctor blade or other device used in the film production.

Figure 3:
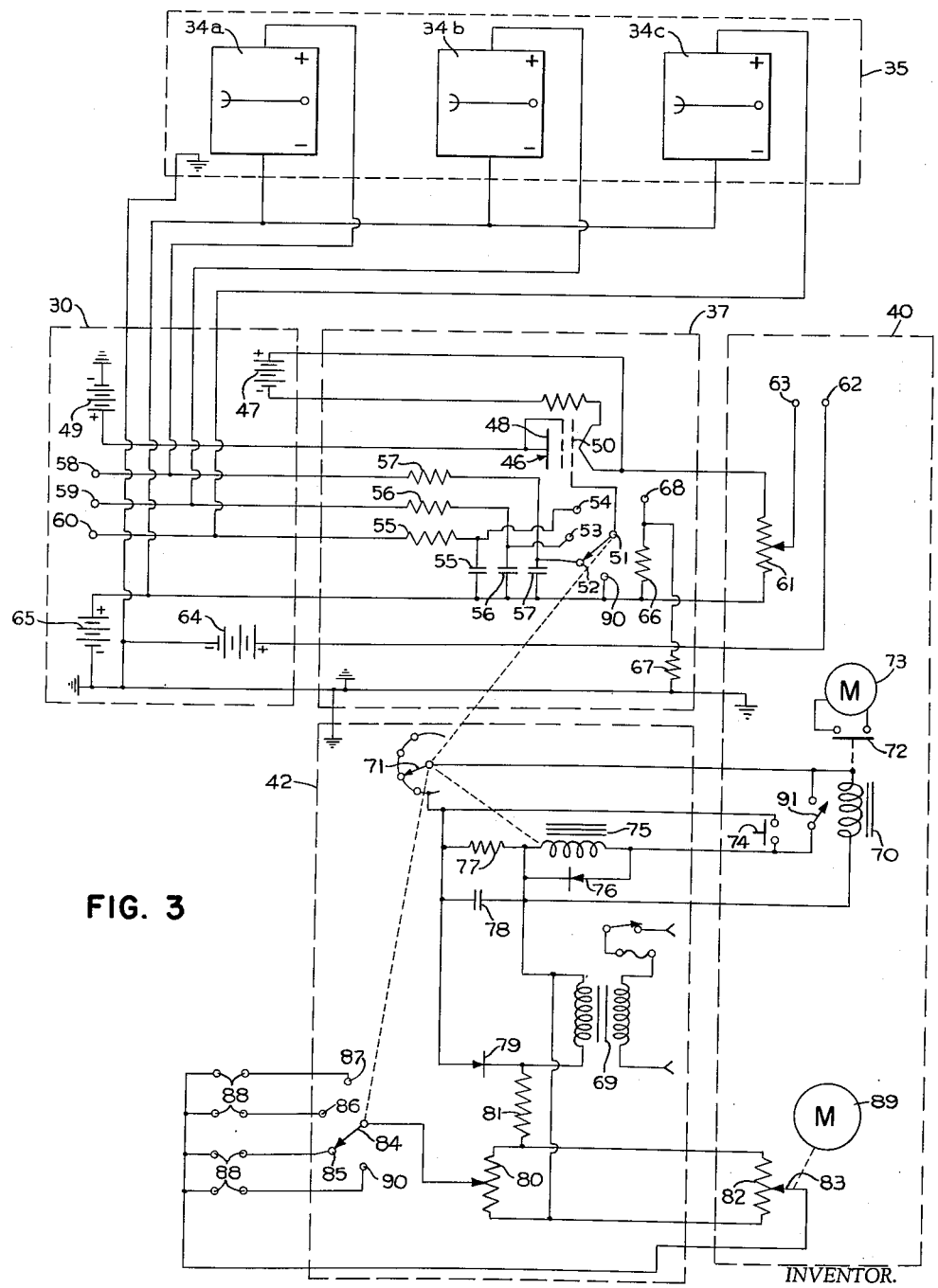
FIG. 3 illustrates typical circuits for use in the automated system.

Circuits used to fully implement the automated thickness gauge and which are connected across the output of the evaluating devices in each station of the gauge are shown in FIG. 3. In general, the dotted outlines in FIG. 3 represent various cabinets of FIG. 2 which house the circuits. It is obvious, of course, that the physical location of the various electrical components is many times immaterial and that other arrangements are possible.

Referring to FIG. 3, the integrating circuit system comprises an electrometer tube 46 whose cathode circuit is energized by voltage source 47 housed in the calibration cabinet 30. The plate or anode 48 of the electrometer 46 is connected to voltage source 49 which also energizes the plates of the evaluating electrometers 8a, 8b, and 8c shown in FIG. 1. The control grid 50 of electrometer 46 is connected sequentially through stepping relay contact 51 and poles 52, 53, and 54 to the RC integrating circuits 55, 56, and 57 and thence to the terminals 58, 59, and 60. The lines to terminals 58, 59, and 60 form the other output leg of electrometers 8a, 8b, and 8c in FIG. 1 and are also connected across meters 34a, 34b, and 34c as shown in FIG. 3. Hence, the meters receive the instantaneous output of the evaluating electrometers. Through the integrating circuit just described the output of electrometer 46 is rendered proportional to the average value of the voltage developed by the evaluating means in the calibration and control system. The output of electrometer 46 is then impressed across zeroing potentiometer 61 in a conventional charter recorder 40 through the connections shown. The output of potentiometer 61 controls the pen of the chart recorder 40 in a conventional manner through terminals 62 and 63. Terminal 62 is connected through voltage supply 64 to ground. A voltage supply 65 is connected between ground and terminal 63 through potentiometer 61. Voltage supplies 64 and 65 provide reference voltages to facilitate zeroing of the chart and meter system. Resistors 66 and 67, connected to pole 68 of stepping relay 51 and the ground side of voltage supply 65, provide a signal to the chart pen for reference marking the chart of recorder 40 at the completion of each cycle of contact 51 when it connects to pole 68. As will become clear, each series of stepping relay contacts is provided with a zeroing pole, collectively numbered 90, for use in the initial zeroing of the entire automation system. This may conveniently be done when the evaluating means in the gauge system are zeroed during the calibration procedure.

The recorder and incremental control system are supplied alternating current through power supply transformer 69 in cabinet 42. The secondary of transformer 69 is connected across the chart motor solenoid coil 70 through the stepping relay contact 71. Chart motor coil 70 actuates switch 72 to drive the chart motor 73. A start switch 74 connects stepping relay coil 75 across the power transformer 69 to pulse the relay contact 71 off the zero contact to start operation of the system. A rectifier 76 to shunt back E.M.F. in coil 75 is connected in parallel therewith and dropping resistor 77 is in series therewith. A smoothing condenser 78 is connected in parallel with the secondary of transformer 69. A second rectifier 79, to provide rectification of the A.C. power from the transformer, completes one circuit of the power supply transformer 69. The secondary of transformer 69 is also connected across bridge and zeroing potentiometer 80, through resistance 81, and incremental control bridge potentiometer 82. The output of these bridge potentiometers is presented to the web thickness controller through stepping relay contact 84 and poles 85, 86, and 87 at the output points designated generally by numeral 88. The automation controller (not shown) may be a variety of devices such as motors, selsyn transformers or the like which move or cause movement of the calender roll or doctor blade of the film producing machine in a manner proportional to the signal received. Such devices are commonly found in the art and need not be described here. The signal to the controller is generated in the incremental control bridge potentiometer 82 through moving contact 83 of potentiometer 82 which is driven directly from the recorder pen motor 89. Thus, the magnitude of the integrated voltage representative of the average deviation in film thickness and which controls the pen, is also transmitted to the controller through the bridge system described. Since potentiometers 80 and 82 are connected to the unrectified A.C. power supply from transformer 69, the signal generated at the movable contact and transmitted to the controller not only has a magnitude representative of the variation in film thickness but a polarity which indicates the direction of error. If desired, the bridge system comprising potentiometers 80 and 82 may be energized with direct current for certain control purposes. Microswitch 91 which connects the stepping relay coil 75 across the line is actuated by a pawl on the chart drive gear (not shown), causing the relay coil 75 to pulse stepping relay contact 71 to the next position at appropriate intervals. Hence, through switch 91 all sequential connections are made simultaneously by an integrated control which steps from gauge to gauge in rapid fashion. Contact 71, of course, automatically positions contacts 51 and 84 at the desired poles to process the incoming signals from the radiation sensors and evaluating circuits previously described.

With the complete system described, it can readily be appreciated that corrections for deviation in film or web thickness are rapidly and automatically accomplished and that desired film thicknesses are easily obtained through a single control. This follows since once the system is calibrated in the manner described it operates automatically to maintain a null output condition in the evaluating electrometers for any radiation absorption value. Any desired absorption value or film thickness may be preselected by impressing the required proportional reference voltage on resistors 9a, 9b, and 9c through moving contact 17 of potentiometer 18. Because of the servo-characteristics of the system which causes it to respond to any output at the electrometers, the film thickness will automatically be adjusted by the mechanical controller until the ionization current generated by radiation incident on the sensors is exactly equal and opposite to the proportional reference voltages on resistors 9a, 9b, and 9c. Any change in either the ionization current due to film thickness variation, or in the reference voltage due to the resetting of contact 17 by the operator, instantly results in an output at the electrometers and the consequent actuation of the controller through the automation servo-mechanism described. Deactuation of the correcting device occurs, of course, immediately upon the return of the null output condition at the electrometers. Hence, by manipulating the single element responsible for generating the reference voltages against which the individual station outputs are constantly compared, a lone operator may rapidly and easily control a film production unit utilizing any number of extremely sensitive radiation thickness gauge units.

While certain representative embodiments and details have been shown for the purpose of illustrating the invention, it will be apparent to those skilled in this art that various changes and modifications may be made therein without departing from the spirit or scope of the invention.

I claim:

1. A radiation thickness gauge having a plurality of stations, each station comprising a gauging means and a connecting means coupling said gauging means to a calibrating and control means common to said plurality of stations; said gauging means comprising a source of ionizing radiation, a radiation sensing device disposed in the field of said source, energizing means connected to said sensing device and supplying a polarized potential thereto, and evaluating means including at least one electron discharge device having at least an anode, cathode and a control electrode, said control electrode being coupled to said sensing device so that said discharge device responds to a signal developed in said sensing device; said connecting means comprising variable voltage divider means connected to said control electrode; and said calibrating means comprising a potential source connected in common with said voltage divider means in a manner to bias said control electrode in said evaluating means oppositely to said signal developed in said sensing device and thereby create a null signal condition thereon for a given radiation intensity at said sensing means.

2. A gauge as claimed in claim 1 in which said calibrating means includes selector means associated with said potential source and adapted to establish criteria predetermining the creation of said null signal condition.

3. A gauge as claimed in claim 1 in which said radiation sensing device comprises an ionization chamber having two conductors spaced apart from one another and said control electrode is connected to one of said conductors.

4. A gauge as claimed in claim 3 in which said calibrating means includes selector means associated with said potential source and adapted to establish criteria predetermining the creation of said null signal condition.

5. A radiation thickness gauge having a plurality of stations, each of said stations having a sensing means and connecting means coupling said sensing means to a calibration means common to said plurality of stations; said sensing means including an ionizing radiation source, an ionization chamber in the field of said source and having an inner conductor and an outer conductor, voltage means connected across said inner and outer conductors to supply a polarizing potential thereto, and evaluating means including at least one electron discharge device having at least an anode, cathode and control electrode, said control electrode being connected to said inner conductor whereby said electron discharge device is controlled by a signal developed thereon; said connecting means comprising voltage divider means between said inner conductor and one side of said voltage means; and said calibrating means comprising a variable voltage source common to said plurality of stations and connected across said voltage divider means in a manner to bias said control electrode oppositely to said signal from said inner conductor to create thereby a null signal condition thereon for a given radiation intensity at said ionization chamber.

6. A gauge as claimed in claim 5 in which said calibrating means comprises potentiometer means associated with said voltage source and adapted to establish therewith criteria predetermining the creation of said null signal condition.

7. A system for monitoring and controlling the thickness of a traveling radiation absorptive web comprising in combination a plurality of ionizing radiation sources disposed at spaced points across said web and emitting radiation towards one face thereof, a plurality of radiation sensing devices each disposed on the opposite side of said web from one of said sources and operatively positioned with respect thereto, energizing means coupled to said sensing devices and supplying a polarized potential thereto, a plurality of evaluating means each coupled to one of said sensing means and adapted to respond to a signal received therefrom, a plurality of variable connector means each coupled to one of said evaluating means, calibration and control means connected in common with said plurality of connector means, said calibration means including a potential source and being adapted to maintain in said plurality of sensing means a uniform response to changes in radiation intensity received thereby due to variations in the thickness of said web by impressing on said sensing means through said connector means an electrical signal of sufficient magnitude to cancel signal components developed in said sensing means due to inherent differences in the characteristics thereof, and means coupled to said evaluating means for adjusting the web thickness in response to signal fluctuations developed in said evaluating means to maintain said web thickness at a substantially constant predetermined value.

8. A system as claimed in claim 7 in which said calibration means comprises selector means associated with said potential source and adapted to establish criteria predetermining said web thickness.

9. A system for monitoring and controlling the thickness of a traveling radiation absorptive web comprising in combination a plurality of ionizing radiation sources disposed at spaced points across said web and emitting radiation towards one face thereof, a plurality of radiation sensing devices each disposed on the opposite side of said web from one of said sources and operatively positioned with respect thereto, a plurality of evaluating means each coupled to one of said sensing means and adapted to respond to a signal received therefrom, energizing means coupled to said sensing means and supplying a polarized potential thereto, a plurality of variable connector means each coupled to one of said evaluating means, calibration and control means in common with said plurality of connector means, said calibration means including a voltage source being adapted to maintain in said plurality of sensing means a uniform response to changes in radiation intensity received thereby due to variations in the thickness of said web by impressing on said sensing means through said connecting means an electrical signal of sufficient magnitude to cancel signal components developed in said plurality of sensing means due to inherent differences in the characteristics thereof, integrating means coupled to said plurality of evaluating means and adapted to integrate instantaneous signals received therefrom and produce signals proportional to the average value of signals received in said evaluating means, and means controlled by said integrated signals to adjust the thickness of said web to maintain said web thickness at a substantially constant predetermined value.

10. A system as claimed in claim 9 in which said calibration means comprises selector means associated with said voltage source and adapted to establish criteria predetermining said web thickness.

11. A system for monitoring and controlling the thickness of a traveling radiation absorptive web comprising in combination a plurality of ionizing radiation sources disposed at spaced points across said web and emitting radiation towards one face thereof, a plurality of ionization chambers each disposed on the opposite side of said web from one of said sources and operatively positioned with respect thereto, each of said chambers having an inner conductor and an outer conductor spaced from each other, energizing means connected across said conductors and supplying a polarizing potential thereto, a plurality of evaluating means each comprising at least one electron discharge device having at least an anode, cathode and control electrode, said control electrode being coupled to one of the conductors of one of said ionization chambers whereby each of said evaluating means is responsive to signals generated in one of said plurality of ionization chambers, a plurality of variable connector means each coupled to said one conductor of said ionization chamber, calibration means connected in common with said plurality of variable connector means and including a voltage source and adapted to maintain in said plurality of ionization chambers a uniform response to changes in radiation intensity received thereby due to variations in the thickness of said web by impressing on said one conductor through said connector means an electrical signal of sufficient magnitude to cancel signal components developed in said plurality of ionization chambers due to inherent differences in the characteristics thereof, and means coupled to said evaluating means for adjusting the web thickness in response to signal fluctuations developed in said evaluating means to maintain said web thickness at a substantially constant predetermined value.

12. A system as claimed in claim 11 in which said calibration means comprises selector means associated with said voltage source and adapted to establish criteria predetermining the value of said web thickness.

13. A system as claimed in claim 12 in which said adjusting means includes integrating means coupled to said plurality of evaluating means and adapted to integrate instantaneous signals received therefrom and produce signals proportional to the average value of signals received from said evaluating means and control thereby said means to adjust said web thickness.

14. A calibration and control circuit for a multi-station radiation thickness gauge, each station of said gauge including a source of ionizing radiation, a radiation sensing device in the field of said radiation source, an electron discharge device having at least an anode, cathode, and control grid, said grid being connected to said sensing device, and energizing means coupled to said radiation sensing device to impress a polarized potential thereto; said circuit comprising in combination in each station of said gauge variable potential dividing means connected between said control grid and one side of said voltage means, and a source of potential connected to and in common with the potential dividers in said stations and adapted to supply therethrough a proportional oppositely polarized voltage to said grid to create thereon a null signal condition for a given radiation intensity at said sensing device.

15. A circuit as claimed in claim 14 in which selector means is associated with said potential source and adapted to establish criteria predetermining the creation of said null signal condition.

16. A calibration and control circuit for a multi-station radiation thickness gauge, each station of said gauge including a source of ionizing radiation, an ionization chamber in the field of said radiation source, said chamber having a center conductor and an outer conductor disposed in spaced relationship thereto, an electron discharge device having at least an anode, cathode, and control grid, said grid being directly connected to said center conductor of said chamber whereby said discharge device is responsive to signals generated in said chamber, and energizing means connected between said center conductor and outer conductor of said chamber to supply polarizing potential thereto; said circuit comprising in combination in each station of said gauge potential dividing means connected to said center conductor, and a source of potential connected to and in common with said potential dividers and adapted to supply therethrough a proportional oppositely polarized potential to said grid to create thereon a null signal condition for a given radiation intensity at said ionization chamber.

17. A circuit as claimed in claim 16 in which selector means is associated with said potential source and adapted to establish criteria predetermining the creation of said null signal condition.

References Cited in the file of this patent

UNITED STATES PATENTS

| | | |
|---|---|---|
| 2,264,725 | Shoupp | Dec. 2, 1941 |
| 2,618,751 | Fearnside | Nov. 18, 1952 |
| 2,750,986 | Russell | June 19, 1956 |
| 2,776,377 | Anger | Jan. 1, 1957 |
| 2,792,730 | Cozzo | May 21, 1957 |
| 2,858,614 | Schuenemann | Nov. 4, 1958 |

FOREIGN PATENTS

| | | |
|---|---|---|
| 692,609 | Great Britain | June 10, 1953 |